United States Patent
Berben (10) Patent No.: US 12,258,358 B1
(45) Date of Patent: Mar. 25, 2025

(54) FERROCENE-SUBSTITUTED ORGANOMETALLIC COMPLEXES

(71) Applicant: THE REGENTS OF THE UNIVERSITY OF CALIFORNIA, Oakland, CA (US)

(72) Inventor: Louise A. Berben, Davis, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 18/732,056

(22) Filed: Jun. 3, 2024

Related U.S. Application Data (63) Continuation of application No. PCT/US2023/077134, filed on Oct. 18, 2023.

(51) Int. Cl.
| | | |
|---|---|---|
| *C07F 15/02* | (2006.01) | |
| *H01M 4/02* | (2006.01) | |
| *H01M 10/0567* | (2010.01) | |
| *H01M 10/0569* | (2010.01) | |
| *H01M 50/437* | (2021.01) | |

(52) U.S. Cl.
CPC ......... *C07F 15/02* (2013.01); *H01M 10/0567* (2013.01); *H01M 10/0569* (2013.01); *H01M 50/437* (2021.01); *H01M 2004/027* (2013.01); *H01M 2004/028* (2013.01); *H01M 2300/0025* (2013.01)

(58) Field of Classification Search
CPC ..... C07F 5/00; C07F 15/02; H01M 2004/027; H01M 2004/028
See application file for complete search history.

(56) References Cited

U.S. PATENT DOCUMENTS

| | | |
|---|---|---|
| 2005/0192470 A1 | 9/2005 | Patil et al. |
| 2006/0159954 A1 | 7/2006 | Haga et al. |

OTHER PUBLICATIONS

A. Arnold, et al, 141(40), Journal of the American Chemical Society, 15792-15803 (2019) ("Arnold") (Year: 2019).*
Z. Li, et al., 50 Energy Storage Materials 105-138 (Available online Apr. 28, 2022)("Li") (Year: 2022).*
Y. Zhen, et al., 480 Journal of Power Sources 229132 (2020) ("Zhen") (Year: 2020).*
V. C. Gibson, et al., 25(8), Organometallics, 1932-1939 (2006) ("Gibson") (Year: 2006).*
PCT Application No. PCT/US23/77134, International Search Report and Written Opinion dated Mar. 5, 2024, 9 pages.
Gibson, et al., Ferrocene-Substituted Bis(imino)pyridine Iron and Cobalt Complexes: Toward Redox-Active Catalysts for the Polymerization of Ethylene, Organometallics, 2006, 25 pp. 1932-1939, especially p. 1933, Scheme 1, formula 9.
Wang, et al., Synthesis, Characterization, and Reactivity of a Pincer-Type Aluminum(III) Complex, Organometallics, 2020, 39 pp. 2732-2738, especially p. 2732, Figure 1, formula B.

* cited by examiner

*Primary Examiner* — Alexander R Pagano
*Assistant Examiner* — Frank S. Hou
(74) *Attorney, Agent, or Firm* — Lathrop GPM LLP; Lisbeth Robinson (57) ABSTRACT

Ferrocene (Fc)-substituted organometallic complexes are described. In one example, an Fc-substituted organometallic complex has a structure represented by formula IV:

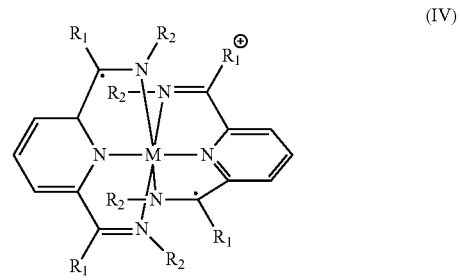

(IV)

where M is a Group 13 metal, $R_1$ is H or a substituted phenyl, and $R_2$ is 4-ferrocenylphenyl. Non-aqueous redox flow batteries and electrical energy storage systems comprising the Fe-substituted organometallic complexes and methods of storing energy using the Fe-substituted organometallic complexes are provided.

20 Claims, 4 Drawing Sheets

FERROCENE-SUBSTITUTED ORGANOMETALLIC COMPLEXES

CROSS-REFERENCE TO RELATED APPLICATIONS

This application is a continuation filed under 5 U.S.C. § 111 (a) of the international (PCT) Application No. PCT/US2023/077134 filed on Oct. 18, 2023, which claims the benefit of U.S. Provisional Patent Application No. 63/379,982, filed Oct. 18, 2022, each of which is incorporated by reference herein in its entirety.

FEDERALLY SPONSORED RESEARCH OR DEVELOPMENT

This invention was made with government support under contract N00014-22-1-2088 awarded by Office of Naval Research NEPTUNE program. The government has certain rights in the invention.

BACKGROUND

Intermittent renewable energy technologies, such as wind and solar, produce excess amounts of electricity at certain times of day and this has created a need to store on-grid electricity for when it is sought by the end user. Redox Flow Batteries (RFBs) are an emerging technology that has garnered considerable interest from the academic community seeking solutions to decarbonize energy infrastructure. RFB technologies are attractive for large grid scale energy storage due to the ability to scale power and energy independently. RFBs could serve as a boon to wind and solar technologies, which struggle with intermitted energy production. The current state of the art charge carriers (also referred herein to as "analytes") for RFBs are Vanadium-based and aqueous. Vanadium-based RFBs have a low energy density, however, due to the small cell voltage, relatively low solubility, and limit to a single electron transferred per charge carrier. Development of new RFB analytes with greater energy densities has focused primarily on switching to nonaqueous media, which increases the solvent window and allows for increased battery cell voltages.

Flow batteries with a symmetric configuration use the same charge carrier at both cathode and anode. Symmetric configuration requires the analyte possesses two reversible redox couples and similar solubilities between charge states. Species crossover leads to irreversible capacity, fade and ultimately loss of battery function.

Charge carriers that store multiple electrons may exhibit various limitations including poor solubility, high cost and low availability for certain metal ions, multi-step synthesis methods, and/or instability. Charge carriers with higher availability metal ions and stability, which can be efficiently synthesized are needed to access additional redox features in the RFB configuration.

SUMMARY

The present disclosure features materials and methods for electrical energy storage. As used herein, ferrocene (Fc) refers to an organometallic compound with the formula $Fe(C_5H_5)_2$, where the two cyclopentadienyl anions are bound to an iron atom center. Fc-substituted organometallic complexes of the present disclosure permit more electron transfer events via the organic ligands as compared to all-organic analytes and redox-active metal/organic analytes described previously. Fc-substituted organometallic complexes of the present disclosure can be used as multi-electron charge carriers, to enhance, for example, the energy density of RFBs including non-aqueous RFBs (NRFBs), or for other energy storage and transfer applications.

In a first aspect, the present disclosure describes an Fc-substituted organometallic complex, according to Formula I:

$$L_1\text{-M-}L_2$$

or a salt thereof, wherein M is a Group 13 metal and ligands $L_1$ and $L_2$ are independently selected from bis(imino)pyridine compounds of Formula II:

(II)

wherein $R^1$, $R^2$, and $R^3$ are independently selected from a hydrogen atom; hydrocarbon groups R, as defined below, having one to twenty carbon atoms with optional inclusion of one or more heteroatoms selected from oxygen, nitrogen, silicon, sulfur, and halogen atoms, wherein the hydrocarbon group is attached to the pyridine ring by a carbon atom; halogen atoms; hydroxy groups; nitrile groups; amino groups —$NR^{11}R^{12}$; ether groups —OR; carboxamide groups —$C(O)NR^{11}R^{12}$ or —$NR^{11}C(O)$R; keto groups —C(O)R, carboxylic acid groups —C(O)OH or salt thereof; ester groups —C(O)OR; sulfonate groups; phosphonate groups; silyl groups, and nitrate groups; wherein $R^{11}$ and $R^{12}$ are independently selected from a hydrogen atom and hydrocarbon groups and R is a hydrocarbon group.

$R^4$ and $R^5$ are independently selected from a hydrogen atom; an aromatic hydrocarbon group with optional inclusion of one or more heteroatoms selected from oxygen, nitrogen, sulfur, and halogen atoms, with optional inclusion of one or more substituents, wherein the aromatic hydrocarbon group is attached to the imine group by a carbon atom; and $Ar^1$ and $Ar^2$ are independently selected from Fc-substituted phenyl groups, also referred to herein as ferrocenylphenyl groups.

In some embodiments, the Fc-substituted organometallic complex is a non-aqueous redox flow battery (NRFB) analyte. As used herein, "analyte" refers to a redox active species participating in charge storage and transfer (also referred to as a "charge carrier"). Up to eight electrons can be stored on the Fc-substituted organic ligands according to Formula II.

In some embodiments, $Ar^1$ and $Ar^2$ are independently selected from a ferrocene substituted phenyl group according to Formula III:

(III)

wherein $R^6$, $R^7$, $R^8$, $R^9$, and $R^{10}$ are independently a hydrogen atom, hydrocarbon groups R, as described below, having one to twenty carbon atoms with optional inclusion of one or more heteroatoms selected from oxygen, nitrogen, silicon, sulfur, and halogen atoms, wherein the hydrocarbon group is attached to the pyridine ring by a carbon atom; halogen atoms; hydroxy groups; nitrile groups; alkylammonium groups, alkylammonium groups attached to the pyridine ring by a carbon atom (—C(N)$R^{11}R^{12}R^{13}$), amino groups —$NR^{11}R^{12}$, ether groups —OR; carboxamide groups —C(O)$NR^{11}R^{12}$ or —$NR^{11}$C(O)R; keto groups —C(O)R, carboxylic acid groups —C(O)OH or salt thereof; ester groups —C(O)OR; sulfonate groups; phosphonate groups; silyl groups, and nitrate groups; wherein $R^{11}$, $R^{12}$ and $R^{13}$ are independently selected from a hydrogen atom and hydrocarbon groups and R is a hydrocarbon group, as described below, with the proviso that at least one of $R^6$, $R^7$, $R^8$, $R^9$, and $R^{10}$ is a ferrocene moiety. In some embodiments, $R^8$ is a ferrocene moiety. In some embodiments, $Ar^1$ and/or $Ar^2$ are 4-ferrocenylphenyl.

In some embodiments, $R^1$, $R^2$ and $R^3$ are a hydrogen atom, $R^4$ and $R^5$ are independently a hydrogen atom or an ethoxyphenyl group, and $Ar^1$ and $Ar^2$ are 4-ferrocenylphenyl. M can include Al, Ga, or M is Al.

In some embodiments, the Fc-substituted organometallic complex of formula I is a salt with a counterion selected from the group consisting of $AlCl_4^-$, $BPh_4^-$, $BF_4^-$, $PF_6^-$, $AsF_6^-$, $SbF_6^-$, $OTeF_5^-$, $OClO_3^-$, $(CF_3SO_2)_2N^-$ and $CF_3SO_3^-$.

In some embodiments, the Fc-substituted organometallic complex comprises an organometallic complex or a salt thereof, represented by formula IV:

(IV)

where M is a Group 13 metal, $R_1$ is a hydrogen or an ethoxyphenyl group, $R_2$ is a ferrocenylphenyl group. One or more counterions can be associated with the organometallic complex. $R_1$ can be an ethoxyphenyl group, $R_2$ can be 4-ferrocenylphenyl, and the counterion can be $CF_3SO_3$ (also referred to herein as OTf). The organometallic complex can carry (n) positive charges and the salt of formula IV can include $[CF_3SO_3^-]_n$ counterions.

In a second aspect, the present disclosure features a Non-Aqueous Redox-Flow Battery (NRFB) comprising: (a) a negative compartment containing a negative electrode disposed within a non-aqueous liquid electrolyte solution; (b) a positive compartment containing a positive electrode disposed within the non-aqueous liquid electrolyte solution; (c) a separator interposed between the positive compartment and the negative compartment; wherein at least one of the negative compartment and the positive compartment comprises an Fc-substituted organometallic complex of the first aspect. Both the negative and positive compartments can include the Fc-substituted organometallic complex. Only one of the negative and positive compartments can include the Fc-substituted organometallic complex. The Fc-substituted organometallic complex can be dissolved in a non-aqueous solvent. The concentration of the Fc-substituted organometallic complex in the non-aqueous solvent can be about 0.5 mM to about 200 mM, about 1 mM to about 100 mM or about 5 to about 20 mM. The non-aqueous solvent can be selected from the group consisting of acetonitrile, gamma-butyrolactone, a cyclic carbonate, propylene carbonate, ethylene carbonate, butylene carbonate, dimethyl carbonate, diethyl carbonate, N-methyl-2-pyrrolidone, N,N-dimethylformamide, N,N-dimethylacetamide, dimethylsulfoxide, dimethyl sulfone, sulfolane, chlorobenzene, cyclopentanone, tetrahydrofuran, 1,4-dioxane, methanol, ethanol, ethylene glycol, diethylene glycol, triethylene glycol, tetraethylene glycol, their mono or di-methyl ethers, 1,3-dioxolane, 1,2 propylene glycol, 1,3 propylene glycol and mixtures thereof. The mixture can be a binary, ternary, or quaternary mixture. The positive and negative electrodes independently include or are selected from C, Si, Ga, In, Al, Ti, V, Cr, Fe, Co, Ni, Cu, Zr, Nb, Ta, Mo, W, Re, Ru, Os, Rh, Ir, Pd, Pt, Ag, Au, alloys thereof, degenerately-doped semiconductors thereof, and oxides thereof, graphite, carbon felt, glassy carbon, reticulated vitreous carbon, nickel on carbon, porous nickel sulfide, a carbon-polyolefin composite, a composite containing polyvinylidene difluoride (PVdF) and activated carbon, or a composite of platinum and titanium. In some cases, the positive and negative electrodes are graphite rods. The separator can include alumina, silica, glass, titania, zirconia, or an anion exchange membrane. In some cases, the separator is a glass frit. The liquid electrolyte solution can further include a supporting electrolyte. The supporting electrolyte can be selected from the group consisting of lithium, sodium, potassium, rubidium, magnesium, calcium, strontium, barium ammonium halides and organic ammonium halides, the group consisting of lithium phosphate, lithium hexafluorophosphate, lithium hexafluoroarsenate, lithium perchlorate, sodium perchlorate, lithium sulfate, magnesium sulfate, and ammonium perchlorate, or a mixture thereof. The supporting electrolyte concentration can be from about 0.25 M to about 25 M, such as about 0.5 M to about 10 M. An optimal range for the concentration of a selected supporting electrolyte can be determined empirically.

The NRFB can be configured to establish electrical communication between the positive electrode, the negative electrode, and an external load directing electrical energy into or out of the NRFB, and/or to establish flow of the electrolyte solutions past the positive and negative electrodes, respectively. The NRFB can further include a storage tank containing additional electrolyte solution in fluidic communication with each of the positive and negative compartments.

In another aspect, the present disclosure features an NRFB with an optional electrolyte comprising: (a) a negative compartment containing a negative electrode; (b) a positive compartment containing a positive electrode; (c) a separator interposed between the positive compartment and the negative compartment; wherein at least one of the negative compartment and the positive compartment comprises the Fc-substituted organometallic complex of formula IV. An electrolyte may be omitted from compartment containing the Fc-substituted organometallic complex of formula IV. Both the negative and positive compartments can include the Fc-substituted organometallic complex of formula IV. The Fc-substituted organometallic complex can be dissolved in a non-aqueous solvent. The Fc-substituted organometallic complex concentration in the non-aqueous solvent can be about 0.5 mM to about 200 mM, about 1 mM to about 100 mM or about 5 to about 20 mM.

The present disclosure also features a method of releasably storing electrical energy comprising connecting the NRFB of any embodiment of the second aspect to an external power source and charging the NRFB to make a current to flow in, whereby the NRFB can be discharged by connecting it to an external circuit having an electric load to make a current to flow out. The NRFB charging and discharging cycles can remain stable for over 100 cycles at 70% state of charge and 97% Coulombic efficiency. In some cases, the cycles can remain stable for over 500 cycles. The NRFB can be connected to an electrical grid to allow renewables integration, peak load shifting, grid firming, baseload power generation and consumption, energy arbitrage, transmission and distribution asset deferral, weak grid support, frequency regulation, or any combination thereof.

The present disclosure further describes an electrical energy storage system comprising an NRFB according to any of the examples of the second aspect described above connected to a power source, and configured to store electrical energy from the power source. The NRFB and the power source can be connected via an AC/DC converter. The system can include a plurality of connected NRFBs and/or power sources. The NRFBs of the plurality can be connected in series.

Unlike RFBs that employ all-organic analytes or organometal analytes where the metal participates in redox processes, the use of Fc-substituted organometallic complexes with Group 13 metals, such as Al, of the present disclosure provides NRFBs with higher energy storage capacity.

The details of one or more examples are set forth in the description below. Other features, objects, and advantages will be apparent from the description and from the claims.

BRIEF DESCRIPTION OF DRAWINGS

This disclosure includes various examples that may be more completely understood in connection with the accompanying drawings, in which.

The various examples discussed in the present disclosure are amenable to modifications and alternative forms. While aspects of these modifications have been shown by way of example in the drawings, and described in detail below, the intention is not to limit the disclosure to the particular examples described. Rather, the intention is to cover all modifications, equivalents, and alternatives falling within the scope of the disclosure, including aspects defined in the claims.

DETAILED DESCRIPTION

The present disclosure features materials and methods for electrical energy storage, including molecular redox-active ligands substituted with a ferrocene moiety, and complexes, referred to herein as ferrocene substituted organometallic complexes. In some examples, a ferrocene substituted organometallic complexes of the present disclosure can be used as a Non-Aqueous Redox Flow Battery (NRFB) analyte.

As used herein, the term "hydrocarbon group" (also denoted by the group R) is, in a first example, composed solely of carbon and hydrogen. In different examples, one or more of the hydrocarbon groups can contain precisely, or a minimum of, or a maximum of, for example, one, two, three, four, five, six, seven, eight, nine, ten, eleven, twelve, thirteen, fourteen, fifteen, sixteen, seventeen, eighteen, nineteen, or twenty carbon atoms, or a number of carbon atoms within a particular range bounded by any two of the foregoing carbon numbers. Hydrocarbon groups in different compounds described herein, or in different positions of a compound, may possess the same or different number of carbon atoms in order to independently adjust or optimize the activity or other characteristics of the compound.

The hydrocarbon groups (R) can be, for example, saturated and straight-chained (i.e., straight-chained alkyl groups). Some examples of straight-chained alkyl groups include methyl, ethyl, n-propyl, n-butyl, n-pentyl, n-hexyl, n-heptyl, n-octyl, n-nonyl, n-decyl, n-undecyl, n-dodecyl, n-tridecyl, n-tetradecyl, n-pentadecyl, n-hexadecyl, n-heptadecyl, n-octadecyl, and n-eicosyl groups.

The hydrocarbon groups (R) can alternatively be saturated and branched (i.e., branched alkyl groups). Some examples of branched alkyl groups include isopropyl (2-propyl), isobutyl (2-methylprop-1-yl), sec-butyl (2-butyl), t-butyl (1,1-dimethylethyl-1-yl), 2-pentyl, 3-pentyl, 2-methylbut-1-yl, isopentyl (3-methylbut-1-yl), 1,2-dimethylprop-1-yl, 1,1-dimethylprop-1-yl, neopentyl (2,2-dimethylprop-1-yl), 2-hexyl, 3-hexyl, 2-methylpent-1-yl, 3-methylpent-1-yl, isohexyl (4-methylpent-1-yl), 1,1-dimethylbut-1-yl, 1,2-dimethylbut-1-yl, 2,2-dimethylbut-1-yl, 2,3-dimethylbut-1-yl, 3,3-dimethylbut-1-yl, 1,1,2-trimethylprop-1-yl, and 1,2,2-trimethylprop-1-yl groups, isoheptyl, isooctyl, and the numerous other branched alkyl groups having up to 20 carbon atoms, wherein the "1-yl" suffix represents the point of attachment of the group.

The hydrocarbon groups (R) can alternatively be saturated and cyclic groups. Some examples of cycloalkyl groups include cyclopropyl, cyclobutyl, cyclopentyl, cyclohexyl, cycloheptyl, and cyclooctyl groups. The cycloalkyl group can also be a polycyclic (e.g., bicyclic) group by either possessing a bond between two ring groups (e.g., dicyclohexyl) or a shared (i.e., fused) side (e.g., decalin and norbornane).

The hydrocarbon groups (R) can alternatively be unsaturated and straight-chained (i.e., straight-chained olefinic or alkenyl groups). The unsaturation occurs by the presence of one or more carbon-carbon double bonds and/or one or more carbon-carbon triple bonds. Some examples of straight-chained olefinic groups include vinyl, propen-1-yl (allyl), 3-buten-1-yl ($CH_2$=CH—$CH_2$—$CH_2$—), 2-buten-1-yl ($CH_2$—CH=CH—$CH_2$—), butadienyl, 4-penten-1-yl, 3-penten-1-yl, 2-penten-1-yl, 2,4-pentadien-1-yl, 5-hexen-1-yl, 4-hexen-1-yl, 3-hexen-1-yl, 3,5-hexadien-1-yl, 1,3,5-hexatrien-1-yl, 6-hepten-1-yl, ethynyl, propargyl (2-propynyl), and the numerous other straight-chained alkenyl groups having up to 20 carbon atoms.

The hydrocarbon groups (R) can alternatively be unsaturated and branched (i.e., branched olefinic or alkenyl groups). Some examples of branched olefinic groups include propen-2-yl ($CH_2$—C.—$CH_3$), 1-buten-2-yl ($CH_2$=C.—$CH_2$—$CH_3$), 1-buten-3-yl ($CH_2$=CH—CH.—$CH_3$), 1-propen-2-methyl-3-yl ($CH_2$—C($CH_3$)—$CH_2$—), 1-penten-4-yl, 1-penten-3-yl, 1-penten-2-yl, 2-penten-2-yl, 2-penten-3-yl, 2-penten-4-yl, and 1,4-pentadien-3-yl, wherein the dot (.) in any of the foregoing groups indicates a point of attachment.

The hydrocarbon groups (R) can alternatively be unsaturated and cyclic (i.e., cycloalkenyl groups). The unsaturation and cyclic group can be aromatic or aliphatic. Some examples of unsaturated and cyclic hydrocarbon groups include cyclopropenyl, cyclobutenyl, cyclopentenyl, cyclopentadienyl, cyclohexenyl, cyclohexadienyl, phenyl, benzyl, cycloheptenyl, cycloheptadienyl, cyclooctenyl, cyclooctadienyl, and cyclooctatetraenyl groups. The unsaturated cyclic hydrocarbon group can also be a polycyclic group (such as a bicyclic or tricyclic polyaromatic group) by either possessing a bond between two of the ring groups (e.g., biphenyl) or a shared (i.e., fused) side, as in naphthalene, anthracene, phenanthrene, phenalene, or indene fused ring systems.

One or more of the hydrocarbon groups (R) optionally include one or more heteroatoms, which are non-carbon non-hydrogen atoms. Some examples of heteroatoms include oxygen (O), nitrogen (N), sulfur(S), silicon (Si) and halogen (halide) atoms. Some examples of halogen atoms include fluorine, chlorine, bromine, and iodine. In some examples, the heteroatom atom inserts between at least two carbon atoms (as in —C—O—C— ether, —C—S—C— thioether, —C—N(R)—C— tertiary amine, or —C=N—C— imine) or between at least one carbon atom and at least one hydrogen atom (as in —C—OH, —C—SH, —C—$NH_2$, —C—NH—C—, or —C(=NH)C—), wherein the shown carbon atom in each case can be considered part of a hydrocarbon group R described above. In some examples, the heteroatom replaces (i.e., substitutes) one or more hydrogen atoms and/or one or more carbon atoms in the hydrocarbon group, as in halogen-substituted groups (e.g., a —$CH_2$F, —$CHF_2$, and —$CF_3$) and carbonyl-substituted groups, such as ketone and aldehyde groups, and silyl groups (—$SiR'_3$). In some examples, the hydrocarbon is substituted with multiple oxygen atoms to result in a dialkyleneoxide or polyalkyleneoxide group, such as a diethyleneoxide or polyethyleneoxide group. In the case of nitrogen or sulfur substitution, the nitrogen or sulfur atom may be bonded to a sufficient number of groups to make it positively charged, as in an ammonium group (e.g., —$NR'_3{}^+$) or sulfonium group (e.g., —$SR'_2{}^+$), in which case the positively charged moiety is associated with a counteranion wherein R' independently represents hydrogen atom or any of the hydrocarbon groups described above. Likewise, a heteroatom can bear a negative charge, as in a deprotonated carboxy, thiocarboxy, sulfonate, phosphonate, hydroxy, or thiol group, in which case the negatively charged moiety is associated with a countercation.

When two or more same or different heteroatoms are bound to each other or located on the same carbon atom, the resulting group containing the heteroatoms is herein referred to as a "heteroatom-containing group". Thus, inclusion or substitution of a hydrocarbon group with one or more heteroatoms also includes heteroatom-containing groups, unless otherwise specified. Some examples of heteroatom-containing groups include carboxy (—C(O)OR' or —OC(O)R'), thiocarboxy (—C(S)OR' or —OC(S)R'), carboxamide (—C(O)$NR'_2$, —C(O)NR'—, or —N(R')C(O)—), urea (—NR'—C(O)—$NR'_2$ or —NR'—C(O)—NR'—), thiourea (—NR=C(S)—$NR'_2$ or —NR'—C(S)—NR'—), carbamate (—NR'—C(O)—OR', —OC(O)—$NR'_2$, or —NR'—C(O)—O—), thiocarbamate (—NR'—C(S)—OR', —OC(S)—$NR'_2$, or —NR'—C(S)—O—), nitro ($NO_2$), nitrile (CN), sulfonyl (—$S(O)_2R'$ or —$S(O)_2$—), sulfinyl (i.e., sulfoxide, —S(O)R' or —S(O)—), disulfide (—C—S—S—C—), sulfonate (—$S(O)_2OR'$), sulfate (—$OS(O)_2OR'$), amine oxide (as typically found in a nitrogen-containing ring), wherein R' independently represents hydrogen atom or any of the hydrocarbon groups (R) described above. For example, —C(O)OR' includes carboxylic acid (—C(O)OH) and carboxylic ester (—C(O)OR), where R and R' is any of the hydrocarbon groups described above. The heteroatom-containing group may also either insert between carbon atoms or between a carbon atom and hydrogen atom, if applicable, or replace one or more hydrogen and/or carbon atoms.

In some examples, the hydrocarbon group (R) is substituted with one or more halogen atoms to result in a partially halogenated or perhalogenated hydrocarbon group. Some examples of partially halogenated hydrocarbon groups include —$CHY_2$, —$CH_2Y$, —$CH_2CY_3$, —$CH(CY_3)_2$, or a halo-, dihalo-, trihalo-, or tetrahalo-substituted phenyl group, wherein Y represents any of F, Cl, Br, or I. Some examples of perhalogenated hydrocarbon groups include —$CY_3$, —$CY_2CY_3$, —$CY_2CY_2CY_3$, —$CY(CY_3)_2$, or perhalophenyl, —$C_6Y_5$).

In some examples, the hydrocarbon group (R) is, or includes, a cyclic or polycyclic (i.e., bicyclic, tricyclic, or higher cyclic) saturated or unsaturated (e.g., aliphatic or aromatic) hydrocarbon group that includes at least one ring heteroatom, such as one, two, three, four, or higher number of ring heteroatoms.

In some examples, any of the generic substituents (e.g., $R_1$, $R_2$, and the like in Formula I) described above may independently exclude any one or more of the classes, subclasses, or particular hydrocarbon groups described above, or may independently include only specific hydrocarbon groups selected from the hydrocarbon groups (R) described above.

When referencing substituted compounds or groups, references to substitution patterns are taken to indicate that the indicated group(s) is (are) located at the indicated position and that all other non-indicated positions are hydrogen. For example, reference to a 4-substituted phenyl group indicates that there is a non-hydrogen substituent located at the 4 position and hydrogens located at the 2, 3, 5, and 6 positions. References to compounds or groups having substitutions at positions in addition to the indicated position will be referenced using comprising or some other alternative language. For example, a reference to a phenyl group comprising a substituent at the 4-position refers to a group having a non-hydrogen atom at the 4-position and hydrogen or any other non-hydrogen group at the 2-, 3-, 5-, and 6-positions.

Each substituted phenyl group can comprise a substituent at the 2-position, a substituent at the 3-position, a substituent at the 4-position, substituents at the 2- and 3-positions, substituents at the 2- and 4-positions, substituents at the 3- and 4-positions, or substituents at the 2-, 3-, and 4-positions. The substituted phenyl group can be a 2-substituted phenyl group, a 3-substituted phenyl group, a 4-substituted phenyl group, or a 5-substituted phenyl group. One or more substituents of a multi-substituted phenyl group can be the same or different; alternatively, all the substituents of a multi-substituted phenyl group can be the same; or alternatively, all the substituents of a multi-substituted phenyl group can be different.

The present disclosure describes Fc-organometallic complexes. In some cases, an Fc-organometallic complex of the present disclosure can be used in energy storage applications, such as an NRFB analyte. Generally, Fc-organometallic complexes as described herein can be characterized as organic octahedral complexes having two tridentate bis(imino)pyridine ferrocene ligands ($I_2P$) coordinating to a Group 13 metal. The complexes can access various ligand charge states: $(I_2P^0)$ $(I_2P^-)M]^{2+}$, $[(I_2P^-)_2M]^+$, $(I_2P^-)(I_2P^{2-})M$, $[(^{N+}I_2P^{2-})(^{N+}I_2P^{2-})M]^{2+}$, $[(I_2P^{2-})_2M]^-$, $[(I_2P^{2-})(I_2P^{3-})M]^{2+}$, and $[(I_2P^{2-})(I_2P^{3-})M]^{6+}$. In some examples, the complex includes four ferrocene moieties (e.g., as described in Formula IV), all four Fc groups can be oxidized at the same time. In some examples, M is aluminum and the ligand charge state further includes $[(I_2P^{3-})_2M]^{3-}$.

An Fc-organometallic complex of the present disclosure can be represented by Formula I:

(I)

or a salt thereof, where M is a Group 13 metal and $L_1$ and $L_2$ are molecular redox-active ligands independently selected from Fc-bis(imino)pyridine compounds according to Formula II:

(II)

where $R^1$, $R^2$, and $R^3$ are independently selected from a hydrogen atom; hydrocarbon groups having one to twenty carbon atoms with optional inclusion of one or more heteroatoms selected from oxygen, nitrogen, silicon, sulfur, and halogen atoms, wherein the hydrocarbon group is attached to the pyridine ring by a carbon atom; halogen atoms; hydroxy groups; nitrile groups; alkyl ammonium groups, wherein the alkyl ammonium group is attached to the pyridine ring by a carbon atom ($-C(N)R^{11}R^{12}R^{13}$), amino groups $-NR^{11}R^{12}$, ether groups $-OR$; carboxamide groups $-C(O)NR^{11}R^{12}$ or $-NR^{11}C(O)R$; keto groups $-C(O)R$, carboxylic acid groups $-C(O)OH$ or salt thereof; ester groups $-C(O)OR$; sulfonate groups; phosphonate groups; silyl groups, nitrate groups, and ferrocene moieties; wherein $R^{11}$, $R^{12}$ and $R^{13}$ are independently selected from a hydrogen atom and hydrocarbon groups and R is a hydrocarbon group.

$R^4$ and $R^5$ are independently selected from a hydrogen atom; hydrocarbon groups having one to twenty carbon atoms with optional inclusion of one or more heteroatoms selected from oxygen, nitrogen, sulfur, and halogen atoms, wherein the hydrocarbon group is attached to the imine group by a carbon atom; and $Ar^1$ and $Ar^2$ are independently selected from substituted phenyl groups.

Ligands of formula (II) can be prepared by methods known in the art, for example, by a condensation reaction between a primary amine and a diketone. Functional groups of a tridentate bis(imino)pyridine ferrocene ligand, according to formula II, can be selected to tune redox properties, chemical stability, and/or solubility of the complex in a non-aqueous solvent.

In some examples, $Ar^1$ and $Ar^2$ are independently a substituted phenyl group according to Formula III:

(III)

wherein $R^6$, $R^7$, $R^8$, $R^9$, and $R^{10}$ are independently a hydrogen atom, hydrocarbon groups R, as described below, having one to twenty carbon atoms with optional inclusion of one or more heteroatoms selected from oxygen, nitrogen, silicon, sulfur, and halogen atoms, wherein the hydrocarbon group is attached to the pyridine ring by a carbon atom; halogen atoms; hydroxy groups; nitrile groups; alkylammonium groups, alkylammonium groups attached to the pyridine ring by a carbon atom ($-C(N)R^{11}R^{12}R^{13}$), amino groups $-NR^{11}R^{12}$, ether groups $-OR$; carboxamide groups $-C(O)NR^{11}R^{12}$ or $-NR^{11}C(O)R$; keto groups $-C(O)R$, carboxylic acid groups $-C(O)OH$ or salt thereof; ester groups $-C(O)OR$; sulfonate groups; phosphonate groups; silyl groups, and nitrate groups; wherein $R^{11}$, $R^{12}$ and $R^{13}$ are independently selected from a hydrogen atom and hydrocarbon groups and R is a hydrocarbon group, as described below, with the proviso that at least one of $R^6$, $R^7$, $R^8$, $R^9$, and $R^{10}$ is a ferrocene moiety. In some embodiments, $R^8$ is a ferrocene moiety. In some embodiments, $Ar^1$ and/or $Ar^2$ are 4-ferrocenylphenyl.

The metal M can be any Group 13 metal. In some cases, M is Al, Ga, or In. Earth abundant and relatively inexpensive, Al(III) can stabilize the complex and access additional redox features that are advantageous for RFBs, including NRFBs.

Depending on the substituents on the ligands, a salt form of the Fc-organometallic complexes can provide enhanced solubility for NRFB applications as compared with the neutral complex. Where each ligand has a $1^-$ charge, the organometallic complex bears a $1^+$ charge (i.e., a Group 13 metal is $3^+$). One or more counterions can be present. For example, where the organometallic complex bears n positive charges, the salt form can include (counterion)$_n$. Suitable counterions include weakly coordinating anions such as, for example, $AlCl_4^-$, $BPh_4^-$, $BF_4^-$, $PF_6^-$, $AsF_6^-$, $SbF_6^-$, $OTeF_5^-$, $OClO_3^-$, $(CF_3SO_2)_2N^-$ and $CF_3SO_3^-$ (also referred to as OTf herein). The skilled artisan can select the anion based on known or observed solubility with other cations in the desired electrolyte solution for an NRFB configuration. In some cases, the anion is selected based on its effect on analyte diffusion kinetics (D) and electron-transfer rate ($k_0$) with the organometallic complex cation.

In some examples, an Fc-substituted organometallic complex of the present disclosure is represented by formula (IV):

(IV)

where M is a Group 13 metal, $R_1$ is hydrogen or ethoxyphenyl, $R_2$ is a ferrocenylphenyl group, such as a 4-ferrocenylphenyl group. The Fc-substituted organometallic complex of formula IV can include a counterion. The counterion can be selected from ions that enhance the solubility of the Fc-substituted organometallic complex in a desired solvent. In some examples, the counterion is $CF_3SO_3^-$.

Embodiments of the present disclosure also include liquid compositions comprising an Fc-substituted organometallic complex for use as an NRFB analyte. For example, the liquid composition can include the Fc-substituted organometallic complex of formula I or IV dissolved in a non-aqueous solvent. The non-aqueous solvent can be acetonitrile (MeCN), gamma-butyrolactone (GBL), a cyclic carbonate (such as propylene carbonate (PC), ethylene carbonate (EC), and butylene carbonate), dimethyl carbonate (DMC), diethyl carbonate (DEC), N-methyl-2-pyrrolidone (NMP), N,N-dimethylformamide (NMF), N,N-dimethylacetamide, dimethylsulfoxide (DMSO), dimethyl sulfone, sulfolane, chlorobenzene, cyclopentanone, tetrahydrofuran (THF), 1,4-dioxane, methanol, ethanol, ethylene glycol, diethylene glycol, triethylene glycol, tetraethylene glycol, their mono or di-methyl ethers, 1,3-dioxolane (1,3DO), 1,2 propylene glycol, 1,3 propylene glycol and mixtures thereof (e.g., solvent mixed with one or more co-solvents). Mixtures can include binary, ternary, and quaternary mixtures. The two or more solvents can be present at any ratio in the mixture. For example, a mixture of a first and second solvent can have a ratio of 0.1-99.9 first solvent:0.1-99.9 second solvent (vol. %). Exemplary binary mixtures include MeCN/PC, MeCN/DMSO, MeCN/EC, MeCN/1,3DO, and MeCN/DMF. A ternary mixture can be 1,3DO/MeCN/DMF, for example, at various ratios of first solvent:second solvent:third solvent.

An Fc-substituted organometallic complex of the present disclosure can exhibit relatively high solubility in non-aqueous solvents and mixtures thereof compared with previously reported multi-electron analytes. The Fc-substituted organometallic complex can be included in any suitable concentration in a liquid composition. Typically, the Fc-substituted organometallic complex concentration is at least about 1.0 mM to about 5,000 mM (where "about" includes the recited value+/-20%). In different embodiments, the Fc-substituted organometallic complex is included in the liquid solution at a concentration of 0.8 mM, 1.0 mM, 5 mM, 7.5 mM, 10 mM, 15 mM, 25 mM, 50 mM, 100 mM, 200 mM, 300 mM, 400 mM, 500 mM, 1,000 mM, 2,500 mM, or 5,000 mM or a concentration within a range bounded by any two of the foregoing exemplary values (e.g., about 5 mM to about 25 mM, about 50 mM to about 200 mM, about 250 mM to about 750 mM, about 500 mM to about 1,000 mM, about 800 mM to about 2,000 mM, and about 500 mM to about 5,000 mM). In one or more embodiments, the solubility of an Fc-substituted organometallic complex in a mixture of non-aqueous solvents is greater than the solubility of the Fc-substituted organometallic complex in a single solvent. An Fc-substituted organometallic complex of the present disclosure can exhibit high stability in organic solvent. Examples are not limited to liquid compositions for use as an NRFB analyte, however.

Accordingly, embodiments of the present disclosure include charge carrier compositions comprising an Fc-substituted organometallic complex according to formula I. The composition can be a solid, semi-solid, or liquid composition. The liquid composition can include a solvent or liquid vehicle into which the Fc-substituted organometallic complex is dissolved or suspended. The vehicle can be an inert liquid medium used as a diluent. In some cases, the charge carrier composition includes the Fc-substituted organometallic complex is in the form of a solid (e.g., a powder or crystal). The solid or semisolid composition can include suitable carriers and/or diluents.

Embodiments of the present disclosure include a method of preparing a salt form of an Fc-substituted organometallic complex according to formula I. A non-limiting exemplary embodiment is described in the Examples below. An alternative method, using 2,6-Bis{1-[(2-methoxyphenyl)imino]-benzyl}pyridine as an exemplary ligand ($L_1$ and $L_2$), includes reducing the ligand, mixing stoichiometric amounts of a Group 13 metal ion and the reduced ligand to form an organometallic complex; and mixing an excess amount of the counter-ion and the organometallic complex to form the organometallic salt. Other species of $L_1$ and $L_2$ defined by Formula II can be used to provide a salt described above. The reagents can be dissolved in an organic solvent such as tetrahydrofuran (THF), diethylether, or dimethoxyethane (DME) before mixing. The Group 13 metal ion can be provided as a trihalide salt of the metal (i.e., $MCl_3$). The counterion can be any of the ions described above (e.g., a triflate ion). The reduction of the ligand can be identified by a first color change. The formation of the organometallic complex can be identified by second color change. The method can further include purifying the organometallic salt. In some cases, purifying includes concentrating the organometallic salt by removing the organic solvent (e.g., using vacuum or distillation), and can further include washing the resulting oily solid (e.g., with benzene), dissolving the washed organometallic salt, filtering the solution, and concentrating the filtered solution to provide a purified organometallic salt powder. The method described above is more efficient than methods requiring preparing a ($L_1^{2-}$)($L_2$)M complex in a first step, and oxidizing the complex in a subsequent step.

Embodiments of the present disclosure further describe an NRFB including a negative compartment containing a negative electrode disposed within a non-aqueous liquid electrolyte solution; a positive compartment containing a positive electrode disposed within the non-aqueous liquid electrolyte solution; a separator interposed between positive and negative compartments; wherein at least one of the negative compartment or the positive compartment includes the Fc-substituted organometallic complex represented by formula I, or salt thereof, dissolved in a non-aqueous solvent. As discussed above, the Fc-substituted organometallic complexes if the present disclosure can increase the number of electrons transferred per molecule and thereby enhance the energy density of an NRFB, and can also improve the cost and/or sustainability of energy storage compared with RFBs using inorganic, organic, and hybrid materials as a charge carrier. An NRFB of the present disclosure can be employed at laboratory, residential, commercial, industrial, or grid-scale for storing energy and has potential for near "drop-in" replacement of existing systems. An NRFB including an Fc-substituted organometallic complex of Formula I as analyte can be compatible with renewable power generation, safe operation, and higher energy density as compared with other commercial battery options. In addition, an NRFB as described herein can operate at a wider range of temperatures than other commercial battery options.

An NRFB of the present disclosure can have a symmetric configuration wherein both the negative and positive compartments include the Fc-substituted organometallic complex dissolved in the non-aqueous solvent and the Fc-substituted organometallic complex can be in its neutral state, i.e., at rest, before the charging process or at completion of the discharging process.

In some cases, an electrolyte can be omitted from the NRFB. For example, an NRFB with an optional electrolyte is also described. The NRFB includes: (a) a negative compartment containing a negative electrode; (b) a positive compartment containing a positive electrode; (c) a separator interposed between the positive compartment and the negative compartment; wherein at least one of the negative compartment and the positive compartment comprises the Fc-substituted organometallic complex of formula VI. Both the negative and positive compartments can include the Fc-substituted organometallic complex of formula VI.

The Fc-substituted organometallic complex can be included in any suitable concentration, typically at least 1.0 mM. In different embodiments, the Fc-substituted organometallic complex is included in the non-aqueous liquid electrolyte solution in a concentration of about 5 mM, 7.5 mM, 10 mM, 12.5 mM, 15 mM, 17.5 mM, 20 mM, 22.5, mM 25 mM, or 50 mM, or a concentration within a range bounded by any two of the foregoing exemplary values (e.g., 5 mM to 15 mM).

Suitable non-aqueous solvents include acetonitrile (MeCN), gamma-butyrolactone (GBL), a cyclic carbonate (such as propylene carbonate (PC), ethylene carbonate (EC), and butylene carbonate), dimethyl carbonate (DMC), diethyl carbonate (DEC), N-methyl-2-pyrrolidone (NMP), N,N-dimethylformamide (DMF), N,N-dimethylacetamide, dimethylsulfoxide (DMSO), dimethyl sulfone, sulfolane, chlorobenzene, cyclopentanone, tetrahydrofuran (THF), 1,4-dioxane, methanol, ethanol, ethylene glycol, diethylene glycol, triethylene glycol, tetraethylene glycol, their mono or di-methyl ethers, 1,3-dioxolane (1,3DO), 1,2 propylene glycol, 1,3 propylene glycol and mixtures thereof. Mixtures can include binary, ternary, and quaternary mixtures and the two or more solvents can be present at any ratio in the mixture. For example, a mixture of a first and second solvent can have a ratio of 0.1-99.9 first solvent:0.1-99.9 second solvent (vol. %). Exemplary binary mixtures include MeCN/PC, MeCN/DMSO, MeCN/EC, MeCN/1,3DO, and MeCN/DMF. A ternary mixture can be 1,3DO/MeCN/DMF, for example, at various ratios of first solvent:second solvent:third solvent.

The positive compartment (i.e., "cathode compartment") contains the liquid electrolyte solution (i.e., "catholyte") in contact with a positive electrode (i.e., "cathode"), wherein the term "positive electrode" does not require that the electrode be in operation to possess a positive polarity, but rather, indicates an electrode suitable in its characteristics (i.e., "when not in operation") for oxidizing the redox active molecule during the charging phase and reducing the redox active molecule during the discharging phase. The negative compartment (i.e., "anode compartment") contains the same liquid electrolyte solution (i.e., "anolyte") in contact with a negative electrode (i.e., "anode"), wherein the term "negative electrode" does not require that the electrode be in operation to possess a negative polarity, but rather, indicates an electrode suitable in its characteristics (i.e., when not in operation) for reducing the redox active molecule during the charging phase and oxidizing the redox active molecule during the discharging phase. The term "positive" and "negative," when modifying an electrolyte solution or compartment, is intended to indicate an electrolyte in contact with the corresponding electrode, and a compartment used for holding the corresponding electrolyte or electrode.

The positive and negative compartments can be constructed of any of the materials known in the art that are non-reactive and suitable for holding non-aqueous (i.e., organic) liquid solutions.

The positive and negative electrodes are independently constructed of any of the electrode materials known in the art. The positive and negative electrodes may independently include or be selected from, for example, graphite (e.g., rods), carbon felt, glassy carbon, reticulated vitreous carbon nickel on carbon, porous nickel sulfide, nickel foam, platinum, palladium, gold, titanium, titanium oxide, ruthenium oxide, iridium oxide, or a composite, such as a carbon-polyolefin composite, or a composite containing polyvinylidene difluoride (PVdF) and activated carbon, or a composite of platinum and titanium, e.g., platinized titanium. In some embodiments, the electrode material may include or be composed of an element selected from C, Si, Ga, In, Al, Ti, V, Cr, Fe, Co, Ni, Cu, Zr, Nb, Ta, Mo, W, Rc, Ru, Os, Rh, Ir, Pd, Pt, Ag, Au, alloys thereof, degenerately-doped semiconductors thereof, and oxides thereof. The choice of electrode material may be dependent on the choice of species of organometallic salt of Formula (I), solvent, and other aspects of the RFB in particular embodiments. For example, graphite rods can minimize deposition of the Fc-substituted organometallic complex during operation of the battery compared to other electrode materials.

The present disclosure also encompasses half cells of the NRFB above. For example, a half-cell can include a compartment containing an electrode disposed in the non-aqueous liquid electrolyte solution comprising an Fc-substituted organometallic complex of the present disclosure dissolved in a non-aqueous solvent. Each compartment and its associated electrode and electrolyte solution define the half-cell.

The separator functions as a barrier to mixing of the first and second electrolyte solutions and/or an electrical insulator to reduce or prevent short circuits between the positive and negative electrodes. The separator can facilitate ion transport between the positive and negative electrolyte chambers, thereby balancing electron transport during charge and discharge cycles. The separator can be selected from any material configured to separate the non-aqueous liquid electrolyte in the positive compartment from the non-aqueous liquid electrolyte in the negative compartment in order to substantially prevent the redox active species of the Fc-substituted organometallic complex in the positive and negative compartments from intermingling with each other, while permitting passage of non-redox-active species between positive and negative electrolyte solutions. Thus, selection of a suitable separator can depend in part on the likelihood that a specific $L_1$ and/or $L_2$ substituent will impede passage of the Fc-substituted organometallic complex. The non-redox-active species are those ionic species that establish electrical neutrality and complete the circuitry in a battery, and which are included in the electrolyte solution (e.g., supporting electrolyte, as described below) or are formed during the course of the redox reactions in each compartment. In order to permit flow of non-redox-active species, the separator component may be, to some extent, porous. Some examples of inorganic or ceramic compositions for the separator component include alumina, silica (e.g., glass), titania, and zirconia. In some cases, the separator is a fine glass frit. Porous organic polymers that do not separate by ionic charge but rather, size exclusion, may also be used. These can work like physical barriers directing flow geometry to prevent mixing. The separator may operate selectively or non-selectively in its ion permeability. The separator component can have any suitable thickness and hardness. In some embodiments, the separator is in the form of a membrane, such as an anion exchange membrane.

The non-aqueous liquid electrolyte solution can include a supporting electrolyte. The electrolyte solutions may also include one or more supporting electrolytes, which may be organic, inorganic, or a combination thereof. The supporting electrolyte is any salt compound that contains a cationic portion (e.g., alkali, alkaline earth, main group, transition metal, or ammonium species) in combination with an anionic portion (e.g., halide, phosphate, perchlorate, sulfate, carbonate, bicarbonate, nitrate, manganate, vanadate, or carboxylate species). Some examples of alkali metal salts include the lithium halides (e.g., LiF, LiCl, LiBr, LiI), sodium halides (e.g., NaF, NaCl, NaBr, NaI), potassium halides (e.g., KF, KCl, KBr, KI), rubidium halides (e.g., RbF, RbCl, RbBr, RbI), lithium phosphate, lithium hexafluorophosphate, lithium hexafluoroarsenate, lithium perchlorate, sodium perchlorate, and lithium sulfate. Some examples of alkaline earth metal salts include magnesium halides (e.g., $MgF_2$, $MgCl_2$, $MgBr_2$, $MgI_2$), calcium halides (e.g., $CaF_2$, $CaCl_2$), $CaBr_2$, $CaI_2$), strontium halides (e.g., $SrF_2$, $SrCl_2$, $SrBr_2$, $SrI_2$), barium halides (e.g., $BaF_2$, $BaCl_2$, $BaBr_2$, $BaI_2$), and magnesium sulfate. Some examples of ammonium salts include the inorganic ammonium halides (e.g., $NH_4F$, $NH_4Cl$, $NH_4Br$, $NH_4I$), organic ammonium halides (e.g., $MeNH_3Cl$, $Mc_2NH_2Cl$, $Me_3NHCl$, $Me_4NCl$, $Et_4NCl$, $Bu_4NF$, $Bu_4NBr$, where Me is methyl, Et is ethyl, and Bu is n-butyl), ammonium perchlorates (e.g., tetrabutylammonium perchlorate, i.e., "TBAP"), and ammonium hydroxides. Generally, the NRFB is operated such that only the NRFB analyte, and not a supporting electrolyte, undergoes a redox reaction.

The supporting electrolyte can be included in any suitable concentration, typically at least 0.01 M. In different embodiments, the supporting electrolyte is included in the electrolyte in a concentration of about 0.1 M, 0.25 M, 0.5 M, 0.6 M, 0.7 M, 0.8 M, 0.9 M, 1.0 M, 1.1 M, 1.2 M, 1.3 M, 1.4 M, 1.5 M, 2 M, 2.5 M, 3 M, 4 M, 5 M, 6 M, 7 M, 8 M, 9 M, 10 M, or 25 M or a concentration within a range bounded by any two of the foregoing exemplary values (e.g., (0.1-1.0 M).

The NRFB can be configured to establish electrical communication between the positive electrode, the negative electrode, and an external load directing electrical energy into or out of the NRFB, and/or to establish flow of the electrolyte solutions past said positive and negative electrodes, respectively.

In some cases, the electrolyte solutions contained in the positive and negative compartments constitute the entire amount of electrolyte solution in the NRFB. Alternatively, the positive and negative compartments can each be connected a conduit (e.g., a pipe or a channel) to a storage (reservoir) tank containing additional electrolyte solution, which serves to replenish spent electrolyte solution and increase the electrical capacity of the NRFB and/or promote flow of the electrolyte solutions. The storage tank volume determines the quantity of energy that can be stored in the NRFB, which may be measured in kWh. Flow can be facilitated by one or more pumps. Suitable piping, control, and other equipment for NRFB systems are known in the art.

Embodiments of the present disclosure further describe a method of making an NRFB. For example, making an NRFB can include immersing a negative electrode in a first non-aqueous liquid electrolyte solution, immersing a positive electrode in a second non-aqueous liquid electrolyte solution, and interposing a semi-permeable separator between the negative and positive electrodes, wherein at least one of the first or second non-aqueous liquid electrolyte solutions includes the Fc-organometallic complex represented by formula I, or salt thereof, dissolved in a non-aqueous solvent.

Embodiments of the present disclosure method of using the NRFB, for example, for electrical energy storage. The method can include charging and discharging the NRFB. For example, the NRFB is discharged by connecting it to an external circuit having an electric load to make a current to flow out, and is charged by connecting it to an external power source to make a current to flow in.

In some examples, an NRFB including an Fc-substituted organometallic complex of the present disclosure can sustain charge or discharge cycles of several hours duration. For example, in a symmetric configuration, an Fc-substituted organometallic complex-based NRFB can maintain stable charging and discharging cycles for over 100 cycles at 70% state of charge and 97% Coulombic efficiency, which can remain can stable over about 500 cycles, 600 cycles, 700 cycles, 800 cycles, 900 cycles or 1000 cycles or more.

Accordingly, embodiments of the present disclosure include energy storage applications where such long charge or discharge durations are desirable. An NRFB including an Fc-substituted organometallic complex of the present disclosure can be used to smooth energy supply/demand profiles and provide a mechanism for stabilizing intermittent power generation sources (e.g., solar and wind energy). For example, in non-limiting examples, the NRFB is connected to an electrical grid to allow renewables integration, peak load shifting, grid firming, baseload power generation and consumption, energy arbitrage, transmission and distribution asset deferral, weak grid support, frequency regulation, or any combination thereof. When not connected to an electrical grid, the NRFB can be used as a power source for remote camps, forward operating bases, off-grid telecommunications, remote sensors, the like, and any combination thereof. The NRFB can provide backup power supplies for a variety of operations, including, for example, telecommunications, hospitals, and other large facilities that require uninterrupted power supplies.

Embodiments of the present disclosure further describe an electrical energy storage system. The system can include an NRFB as described above connected to a power source. The NRFB can be configured to store electrical energy from the power source. In some cases, the NRFB and the power source are connected via an AC/DC converter. The system may require higher charge or discharge voltages than available from one NRFB. In such cases, several NRFBs can be connected in series such that the voltage of each cell is additive. An electrically conductive, but non-porous material (e.g., a bipolar plate) may be employed to connect adjacent cells to allow for electron transport without fluid (or gas) transport between adjacent cells. The positive electrode compartments and negative electrode compartments of individual cells can be suitably fluidically connected via common positive and negative fluid manifolds in the stack.

Examples

The following Example is intended to illustrate the above invention and should not be construed as to narrow its scope. Numerous variations and modifications may be made while remaining within the scope of the invention.

Enhanced Electron Storage with $Al^{3+}$-Bisiminopyridine Ferrocene Complex

A. Introduction

The current state of the art RFB analytes are Vanadium (VRFB) based and aqueous. VRFBs make use the $V^{2+}/V^{3+}$ couple for the negative electrolyte and $V^{4+}/V^{5+}$ couple as the positive electrolyte. VRFBs are reportedly wildly stable under electrochemical cycling, giving the analyte an average lifetime of 20 years. However, the energy density of the cell is limited because only a single mole of electrons is exchanged for each mole of vanadium that is oxidized or reduced, and the maximum concentrations of $V^{2+}$ and $V^{3+}$ ions are limited to ≈2M (under normal operating temperatures).

The energy density for RFB analytes is dictated by the equation, $$E_D = \frac{1}{2} nFC_{active} V_{cell} \quad \text{(Equation 1)}$$

where n is the number of electrons transferred per charge carrier, $C_{active}$ is the concentration of analyte in solution, and $V_{cell}$ is the cell voltage, and F is Faraday's Number. There is an ongoing effort to engineer new RFB analytes with greater energy densities, such as switching to nonaqueous media (i.e., NRFBs), synthetic modification of the analyte, redox targeting, and increasing the amount of redox events analyte can undergo. Analytes that store four electrons (e.g., Table 1 of WO2022056272 A1, pub. Mar. 17, 2022, which is incorporated by reference herein), such as (bpy-COOMe$_2$)$_3$Cr complexes, very stable polyoxovanadate clusters, phthalocyanine Mn-nitride (PcMnN), porphyrins (H$_2$TPP), diaminoanthraquinones (DAAQ), functionalized fullerenes, and dodecaborate clusters have been developed. The current limitations of these individual systems vary widely and include poor solubility, high cost and low availability for certain metal ions, multi-step synthesis methods, instability, or a combination of these factors.

Metal Coordination compounds (MMCs) with non-innocent ligands are a class of RFB analyte that have shown promise as next generation high capacity RFB analytes due in part to their ability to undergo multiple redox events. For Example, 6-coordinate $Cr^{3+}$ and $Cr^0$-bipyridine complexes able to undergo 6 sequential redox events, 3 of which were metal based and 3 were ligand based. 6-coordinate $Fe^{2+}$-bypyridine complexes able to undergo 4 sequential redox events, 1 metal based and 3 ligand based, a 6-coordinate $Al^{3+}$-bisiminopyridine complex able to undergo 4 sequential redox events, all of which were ligand based, and 6-coordinate $Ni^{2+}$-bipyridylimino isoindoline complexes able to undergo 3 sequential redox events, 1 metal based and 2 ligand based have been tested. Tethering other redox active molecules to a non-innocent ligand of an MMC, creating a so called bipolar redox-active molecule (BRM), may provide access to 4 available redox couples in a symmetric configuration.

The present example describes an $Al^{3+}$-bisiminopyridine ferrocene complex able to undergo 8 electron transfer events: a single 4 electron transfer which is are Fc-based and 4 sequential redox events that are $I_2P$-ligand based, apparently exceeding the number of electrons transferred per charge carrier of any known RFB analyte.

B. Synthesis

Figure 1:
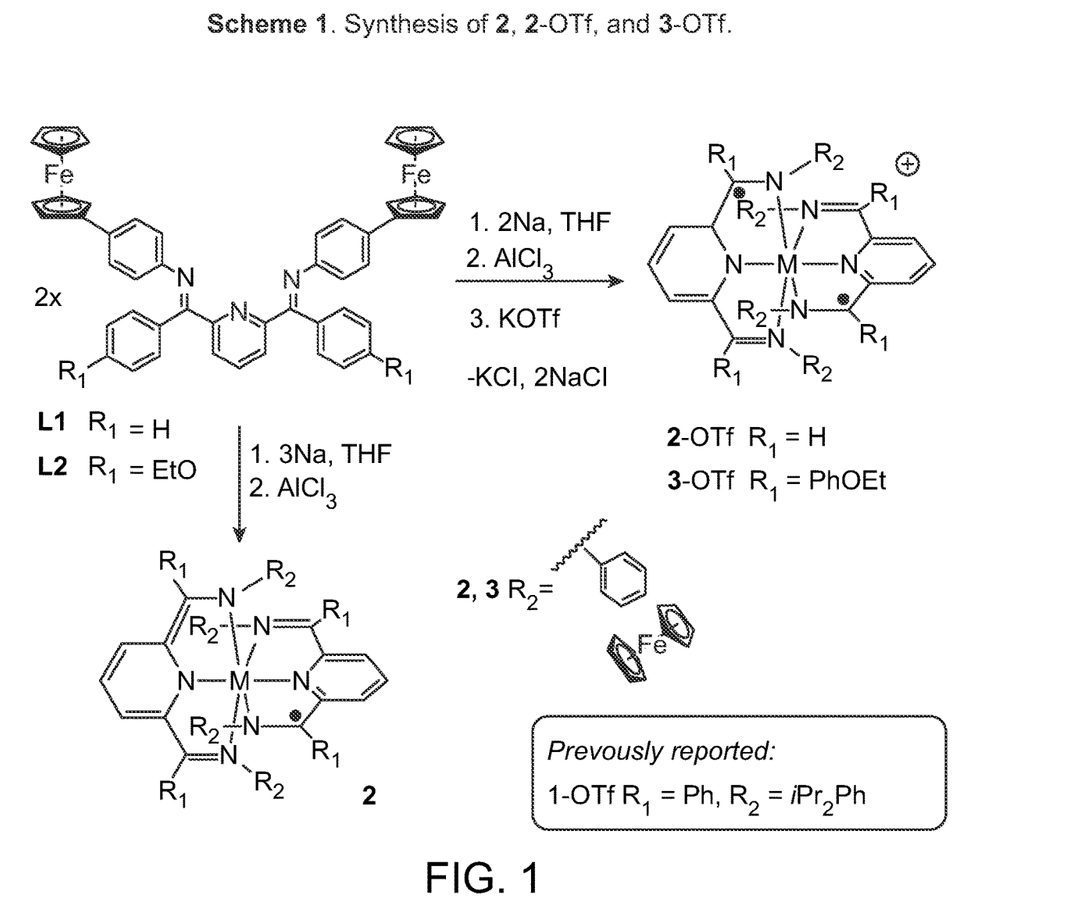
FIG. 1 shows representative structures for ferrocene substituted organometallic complexes, consistent with the present disclosure.

The synthesis of $I_2P$-ligand based complexes 2, 2-OTf and 3-OTf is shown schematically in FIG. 1. Complex "1-OTf" is described previously (see, e.g., complex 2b in WO2022056272A1, pub. Mar. 17, 2022, the disclosure of which is incorporated by reference herein). All manipulations were carried out using standard Schlenk or glovebox techniques under a dinitrogen atmosphere. Unless otherwise noted, solvents were deoxygenated and dried by thorough sparging with Ar gas followed by passage through an activated alumina column. Deuterated solvents were purchased from Cambridge Isotopes Laboratories, Inc. and were degassed and stored over activated 3 Å molecular sieves prior to use. 4-Ferrocenyl Aniline synthesized according to previously reported method. Other reagents, such as 99% AlCl$_3$ (Strem), were purchased from commercial vendors and used without further purification.

$_{Fc}I_2P$, L1. 2,6-Dibenzoylpyridine (0.942 g, 3.28 mmol), 2 equivalents of 4-ferrocenylaniline (2.00 g, 7.22 mmol), and 0.01 equivalent of TsOH·H$_2$O (0.006 g, 0.0328 mmol) were added to a standard Schlenk flask fitted with a Dean Stark trap. The flask was evacuated and refilled with nitrogen and then 60 mL of toluene was added, along with 3 Å molecular sieves which were added to the Dean Stark trap. The reaction mixture was then fitted with a reflux condenser and set to reflux while the reaction was monitored periodically using HRMS. The mixture was cooled to room temperature, the solvent removed in vacuo, and the resulting sticky solid was washed with Et$_2$O (3×10 mL) to afford an orange-brown solid. The orange-brown solid was then extracted into THF/Et$_2$O (2:1), and removal of that solvent mixture in vacuo afforded an orange solid.

2,6-di(4-ethoxybenzoyl)pyridine ($^{EtO}K_2P$). A solution of 2,6-pyridine dicarbonyl chloride (10.0 g, 49.0 mmol) in dichloromethane (200 mL) containing suspended AlCl$_3$ (13.7 g, 103 mmol) was stirred for 2 h. The reaction mixture was then cooled in an ice bath, and a solution of phenetole (18.0 g, 147 mmol, d=0.967 g/mL) in dichloromethane (30 mL) was added dropwise over 30 min. The mixture was allowed to warm to room temperature; the reaction was stirred for 48 h and then quenched by addition of dry ethanol (30 mL). The mixture was stirred for 15 min, then filtered through Celite before it was washed with DI water (3×100 mL), and the combined organics dried with Na$_2$SO$_4$ before the solvent was evaporated to afford an impure product as a white powder. Following recrystallization from dichlo- romethane/hexane (10:50 mL), the product was collected as a fine white powder (14.9 g, 81% yield). $^1$H NMR (400 MHZ, CDCl$_3$) δ 8.19 (dd, J=9.0, 7.1, 6H), 8.07 (dd, J=8.5, 7.1, 1H), 6.96-6.79 (m, 4H), 4.10 (q, J=6.9, 4H), 1.44 ppm (t, J=7.0 Hz, 6H). $^{13}$C {$^1$H} NMR (400 MHZ, CDCl$_3$) δ 191.1, 163.1, 154.5, 138.1, 133.8, 128.6, 126.45, 113.9, 77.2, 63.8, 14.7. GC/MS fragment=375.2 m/z.

2,6-Bis{[(4-ferrocenylphenyl)imino]-4-ethoxybenzyl}pyridine ($^{EtO}_{Fc}$I$_2$P, L2)

2,6-Di(4-ethoxybenzoyl)pyridine (1.24 g, 3.30 mmol, 1 eq), 4-ferrocenylaniline (2.00 g, 7.22 mmol), and 0.1 equivalents of TsOH·H$_2$O (0.006 g, 0.03 mmol) were added to a 100-mL Schlenk flask fitted with a Dean Stark trap. The flask was evacuated and refilled with nitrogen, and then 60 mL of benzene was added to the reaction mixture and 3-A molecular sieves were added to the Dean Stark trap, along with a reflux condenser. The mixture was heated to reflux for 72 h, and during that time the progress of the reaction was monitored using HRMS. The reaction mixture was concentrated to dryness and the sold was washed with Et$_2$O (3×10 mL). The resulting orange-brown solid was extracted into 10 mL of THF/Et$_2$O (1:2), filtered through celite and then the solvent was removed in vacuo to afford 2.12 g of an orange solid (72% yield, MW 893.69 g/mol). $^1$H NMR (400 MHZ, C$_6$D$_6$) δ 8.19. $^{13}$C NMR (400 MHZ, C$_6$D$_6$) δ. HRMS Fragment: 893.

[($_{Fc}$I$_2$P$^-$)($_{Fc}$I$_2$P$^{2-}$)Al)] (2)

Solid sodium (37 mg, 1.60 mmol) was added to a solution of $_{Fc}$I$_2$P (806 mg, 1.00 mmol) in THF (3 mL). The solution was stirred for 12 h and turned from a yellow to dark brown color. To this solution, AlCl$_3$ (66.6 mg, 0.50 mmol) dissolved in THF (4 mL) was added in portions over 5 min to yield a deep red-purple solution. The reaction mixture was stirred for 1 h, and the solvent was removed in vacuo, extracted into 5 mL of benzene, and filtered over Celite to remove salts. Benzene was removed in vacuo to yield 2. Single crystals suitable for X-ray diffraction were grown by the slow diffusion of pentane into a concentrated THE solution over 4 days in a freezer at −20° C. Yield: 0.704 g (86%). MW 1638.2 g/mol. Anal. Calcd. for C$_{102}$H$_{78}$N$_6$AlFe$_4$: C, 74.79; H, 4.80; N, 5.13%. Found: CX; H X; N X. UV-Vis spectrum (MeCN) λmax (εM): (L mol$^{-1}$ cm$^{-1}$). μ$_{eff}$=2.4μ$_B$.

[($_{Fc}$I$_2$P$^-$)$_2$Al]OTf (2-OTf)

Solid sodium (14.0 mg, 0.604 mmol) was added to two equivalents of the $_{Fc}$I$_2$P (0.605 mmol, 487 mg) dissolved in THF (3 mL). After stirring for 16 h, the solution was a black color. One equivalent of AlCl$_3$ (0.301 mmol, 40.2 mg) dissolved in THF (3 mL) was added, resulting in a color change to a dark orange-red solution, which was stirred for 1 h. Potassium trifluoromethanesulfonate (1.1 equiv., 0.333 mmol, 62.6 mg) dissolved in THF (2 mL) was added. After stirring overnight, the solution was removed in vacuo. Benzene (10 mL) was stirred with the oily solid for 1 h and then the mixture was filtered through Celite. The reaction mixture was then concentrated to dryness and washed with diethyl ether (3×2 mL), filtered through the same Celite pad and then concentrated to a black-red powder to afford 0.291 g (54% yield, MW 1787.2 g/mol). Anal. Calcd. for C$_{103}$H$_{78}$N$_6$O$_3$SF$_3$AlFe$_4$: C, 69.22; H, 4.40%; N, 4.70%. Found: C, X; H, X; N, X. UV-Vis spectrum (MeCN) λmax (ε$_M$): (L mol$^{-1}$ cm$^{-1}$). μ$_{eff}$=2.4μ$_B$.

$[(^{EtO}{}_{Fc}I_2P^-)_2Al)](OTf)$ (3-OTf)

Sodium metal (13.9 mg, 0.604 mmol) was added to $^{EtO}{}_{Fc}I_2P$ (539 mg, 0.603 mmol) dissolved in THF (3 mL). After stirring for 16 h, the solution had turned black, and then 40.2 mg of $AlCl_3$ (0.301 mmol dissolved in 3 mL THF) was added dropwise. The resulting dark orange-red solution was stirred for 1 h before 2 mL of a THF solution containing $K(CF_3SO_3)$ (62.6 mg, 0.333 mmol) was added, and then the mixture was stirred overnight before the solution was removed in vacuo to afford an oily solid. The oil was triturated with benzene (2×10 mL) over 2×1 h, and then the mixture was filtered through Celite. The reaction mixture was concentrated to dryness; the resulting solid washed with diethyl ether (3×2 mL), filtered through the same Celite pad, and then concentrated to afford 366 mg of a black-red powder (62% yield, MW 1963.4 g/mol). Anal. Calcd. for $C_{111}H_{94}N_6O_7SF_3AlFe_4$: C, 67.90; H, 4.83; N, 4.28%. Found: C, X; H, X; N, X. UV-Vis spectrum (MeCN) λmax (εM): (L mol$^{-1}$ cm$^{-1}$). $\mu_{eff}$=2.4$\mu_B$.

C. Solid State Structures

Figure 2A:
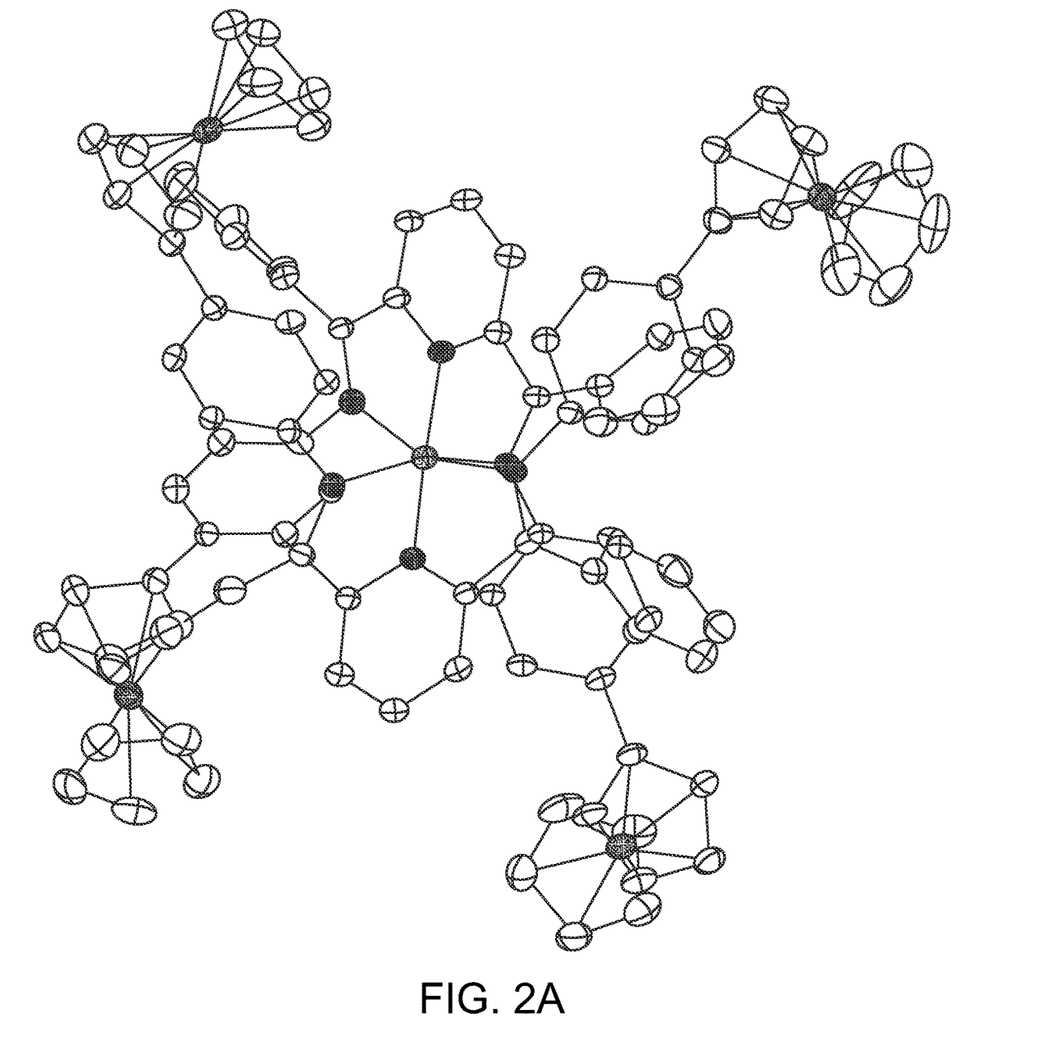
FIG. 2A shows the solid state structure of compound 2, a ferrocene substituted organometallic complex, consistent with the present disclosure. Shaded ellipsoids represent Fe, N, Al and C atoms. Solvent molecules and H atoms have been removed for clarity. Ellipsoids shown at 50%.
Figure 2B:
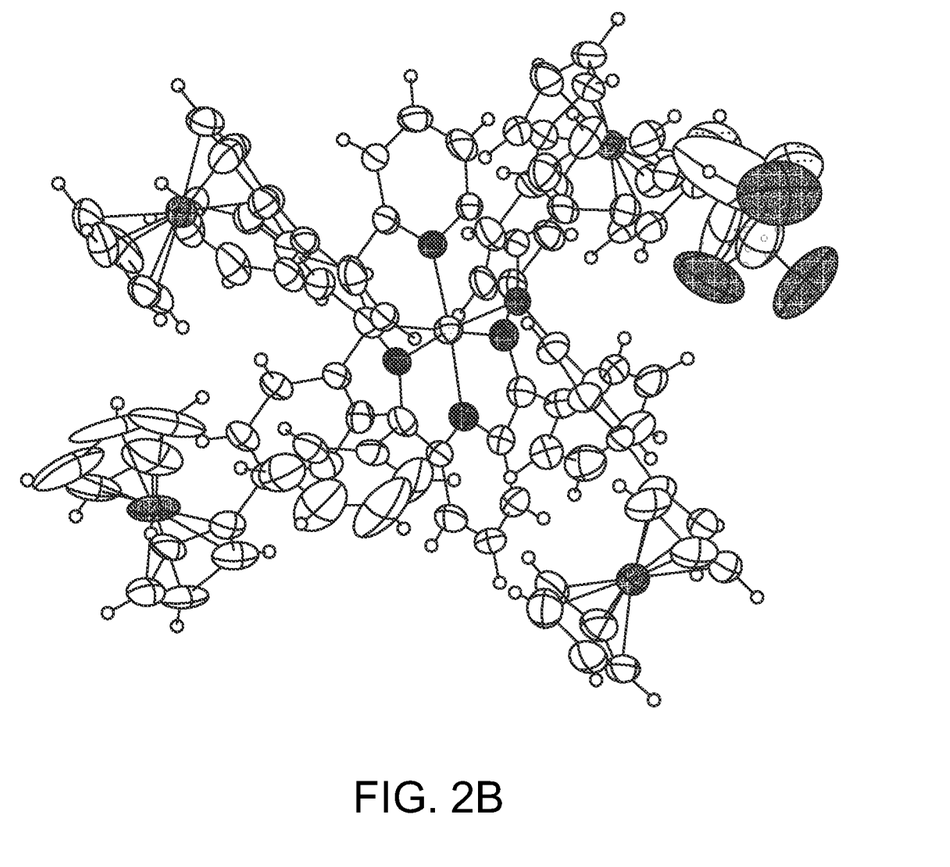
FIG. 2B shows the solid state structure of $2^+$ of 2-OTf, a ferrocene substituted organometallic complex, consistent with the present disclosure. Ellipsoids represent H, Fe, F, C, N, O, Al, S, and F atoms. Ellipsoids shown at 50%.

Solid state structures of crystals of 2, 2-OTf and 3-OTf obtained from solutions over 3 days were probed using single crystal X-ray diffraction data collected at 77 K. (see FIG. 2A (2) and FIG. 2B (2-OTf)). Briefly, X-ray diffraction studies were carried out on a Bruker SMART APEXII, and a Bruker Photon100 CMOS diffractometer equipped with a CCD detector (SMART Software Users Guide, Version 5.1, Bruker Analytical X-Ray Systems, Inc.). Measurements were carried out at 90 K using Mo Kα (λ=0.71073 Å) and Cu Kα (1.5418 Å) radiation. Crystals were mounted on a Kaptan Loop with Paratone-N oil. Initial lattice parameters were obtained from a least-squares analysis of more than 100 centered reflections; these parameters were later refined against all data. Data was integrated and corrected for Lorentz polarization effects using SAINT (SAINT Software Users Guide, Version 7.0, Bruker Analytical X-Ray Systems, Inc.) and were corrected for absorption effects using SADABS2.3 (SADABS, Version 2.03, Bruker Analytical X-Ray Systems, Inc.).

Space group assignments were based upon systematic absences, E statistics, and successful refinement of the structures. Structures were solved by direct methods with the aid of successive difference Fourier maps and were refined against all data using the SHELXTL 5.0 software package (SHELXTL Version 6.12, Bruker Analytical X-Ray Systems, Inc.). Thermal parameters for all non-hydrogen atoms were refined anisotropically. Hydrogen atoms, where added, were assigned to ideal positions and refined using a riding model with an isotropic thermal parameter 1.2 times that of the attached carbon atom (1.5 times for methyl hydrogens).

D. Determination of Solubility

Stock solutions of each complex are prepared in acetonitrile. These are then diluted in 10 mL volumetric flasks to prepare four standard solutions. The absorbance of these four solutions are obtained and a suitable wavelength is chosen for a calibration curve of absorbance versus concentration. Saturated solutions are obtained by stirring excess complex in 400-500 μL of MeCN in a 20 mL vial. The solution is then filtered through a kimwipe pipette filter to remove undissolved material, and the saturated solution is then diluted in order for absorbances to fall within the absorption range of the calibration curve.

E. Cyclic Voltammetry

Figure 3A:
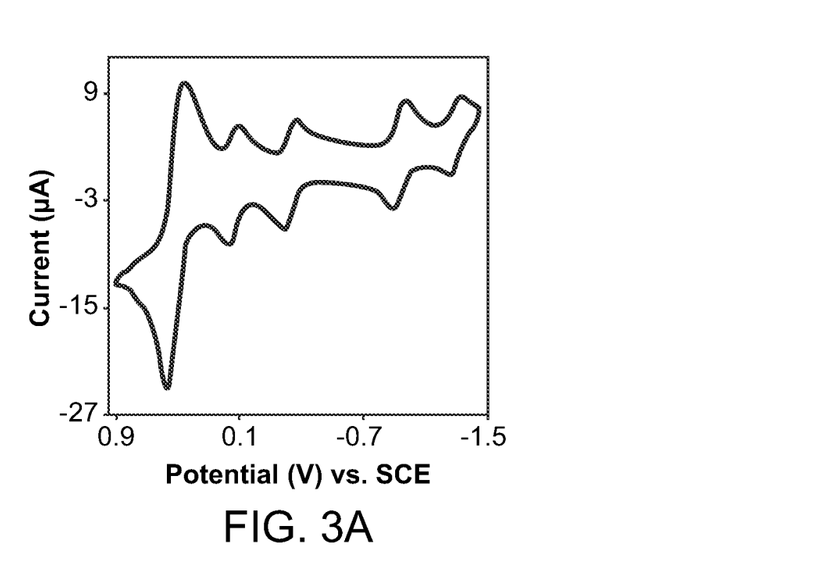
FIGS. 3A and 3B show Cyclic Voltammograms (CV) of 2-OTf (A) and 3-OTf (B), which are ferrocene substituted organometallic complexes consistent with the present disclosure.
Figure 3B:
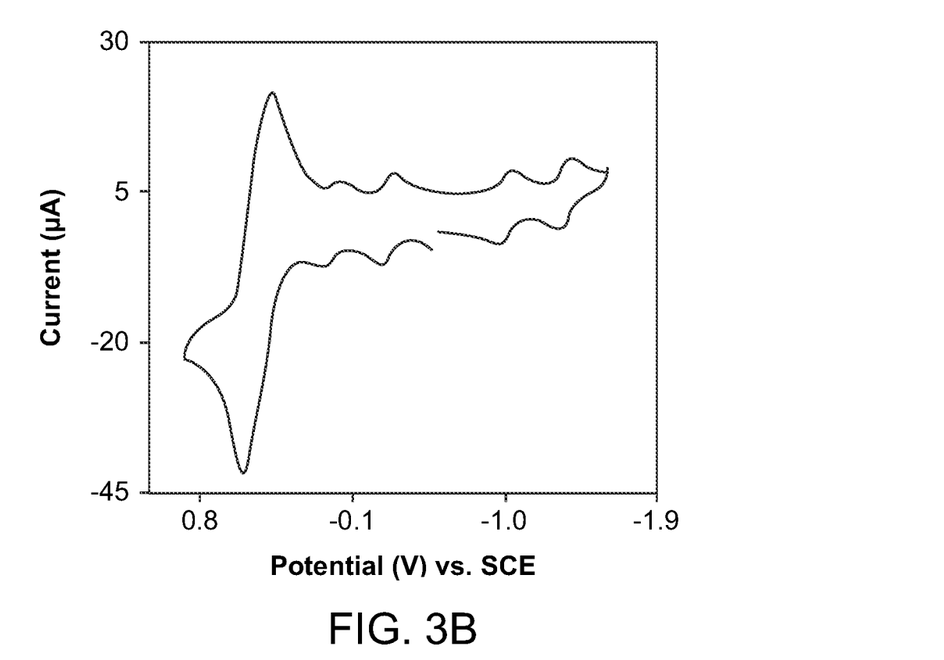

Cyclic voltammetry (CV) measurements were used to determine the $E_{1/2}$ values for 2-OTf and 3-OTf, and those measurements were performed in 0.1 $Bu_4NBF_4$ MeCN solution. Five redox couples, corresponding to 8 electron transfer (ET) events were observed over the potential range for 2-OTf and 3-OTf, respectively (FIGS. 3A and 3B). The electrochemistry of 2 is expected to be the same as 2-OTF, although 2-OTf has different solubility. The range of about 1.8 V over which the redox couples are observed provides an estimation of the $V_{cell}$ for a battery which could be constructed using $2^+$ as the analyte, if the battery is constructed with a symmetric configuration where 2 is the analyte for both the cathode and anode.

Compared to 2-OTf, the $V_{cell}$ of 3-OTf is slightly wider. For 3-OTf, the redox events observed in the CV correspond to the $3^{6+/2+}$ four-electron couple at +0.60 V, the $3^{2+/+}$ couple at +0.00 V, the $3^{+/0}$ couple at −0.33 V, the $3^{0/-}$ couple at −1.02 V, and the $3^{-/2-}$ couple at −1.39 V vs SCE. The range of 1.9 V over which these couples are observed provides an estimation of the $V_{cell}$ for a battery which could be constructed using $3^+$ as the analyte, if the battery is constructed with a symmetric configuration where 3 is the analyte for both the cathode and anode. In that configuration a total of 4 electrons could be stored in the battery per cycle.

Cyclic voltammograms (CVs) were recorded in a nitrogen-filled glovebox with a CH Instruments Electrochemical Analyzer Model 620D or 1400 with a glassy carbon working electrode (CH Instruments, nominal surface area of 0.071 cm$^2$), a platinum wire auxiliary electrode, and an Ag/AgNO$_3$ (0.001M) non-aqueous reference electrode with a Vycor tip. All potentials are referenced to the SCE couple, and ferrocene was used as an external standard where the $E_{1/2}$ of ferrocene/ferrocenium is +0.40 V vs. SCE in 0.1 M $Bu_4NPF_6$ MeCN. $Bu_4NPF_6$ was recrystallized from ethanol and placed under vacuum for 72 hours before electrolyte solutions were made. Electrolyte solutions were stored over 3 Å molecular sieves for at least 48 hours before use. Sieves were activated by heating under vacuum at 270° C. for at least 72 hours. UV-Vis spectra were obtained using a 1 cm cuvette using an Agilent 8453 UV-vis spectrophotometer.

F. Mass Transport and Electrokinetics

The mass transport and electrokinetics of 2-OTf and 3-OTf are measured. There is a need for RFB analytes to have fast diffusion kinetics (D) and large heterogeneous electron-transfer rate ($k_0$) to enable facile charging and discharging of a battery. For reversible systems, fast diffusion kinetics are characterized by values of $k_0$ that greater than or equal to $10^{-1}$ cm$^2$/s. For quasi reversible, values of $k_0$ can range from $10^{-1}$ to $10^{-5}$ cm$^2$/s, as previously reported. For RFB analytes, $k_0$ of $10^{-5}$ cm/s is considered a minimum requirement. The rate is also dependent on the electrode material. Glassy carbon (GC) button electrodes can be orders of magnitude faster that Hg, Au, and Pt, and therefore suitable for this example. The diffusion coefficients are determined via CV and Randles-Sevcik Equation (Current was varied as a function of scan rate, and the D-values are determined by plotting the current density versus the square root of the scan rate (see calculation below)). From the slope of the line of best-fit and the Randles-Sevcik equation, D for each redox couple is obtained.

G. Charge-Discharge Studies

Complexes are tested in both symmetric and asymmetric NRFB configurations. An exchange membrane and a glass frit as separator between the working electrode and counter electrode compartments are trialled. The state of charge is calculated based on Calculation 3 (Below). Charge-discharge studies are performed inside of a glovebox under an inert atmosphere using a CH Instruments Electrochemical Analyzer Model 1400. A custom H-cell is designed with compartments separated by an AMI-7001S Anion exchange membrane (Membrane International Inc.) or glass frit. If a membrane is used, it is soaked in 0.5 M nBu$_4$NBF$_4$ MeCN electrolyte solution for 48 h prior to use. The working compartment is fit with an Ag/AgNO$_3$ reference electrode, the working electrode identified from the cell tests, and 7.5 mM of the complex in 3.5 mL 0.5 M nBu$_4$NBF$_4$ MeCN electrolyte solution. In the asymmetric studies, the counter compartment contains only 3.5 mL 0.5 M nBu$_4$NBF$_4$ MeCN electrolyte solution, and a counter electrode.

For studies with a symmetric NRFB configuration, the first cycle is a galvanostatic charging of a concentrated solution of a selected complex (e.g., a complex shown in FIG. 1); 3.5 mL 0.5 M nBu$_4$NBF$_4$ MeCN electrolyte solution is charged to the counter compartment, and 3.5 mL 15 mM of the complex in 0.5 M nBu$_4$NBF$_4$ MeCN electrolyte solution is charged to the working compartment. A 0.2 mA current was applied to the working compartment until a potential cut-off of −0.6 V was reached (approximately 2 hours). The electrolyte solution in the counter compartment was then discarded and 1.75 mL of the 15 mM of the complex is charged to the counter compartment and both compartments were diluted to reach 3.5 mL of 7.5 mM the complex. In both symmetric and asymmetric studies, a stirring rate of 900 RPM may be optimal for C/D studies. Between experiments, the electrodes are soaked and sonicated with 1M HCl, followed by distilled water twice, then acetone. The electrodes are dried at 100° C. for two hours prior to use.

Calculations

Calculation 1. Randles-Sevcik equation to calculation diffusion coefficients ($D_0$).

The diffusion coefficients for each redox couple are determined by first plotting CV's of a selected complex at varying scan rates (0.2-8 V/s). The diffusion coefficients are then determined from the slope of the peak current density ($j_p$) versus the square root of the scan rate ($\upsilon^{1/2}$):

$$j_p = 268600 n_e^{3/2} D_0^{1/2} C_0 \upsilon^{1/2} \quad \text{(Equation 2)}$$

Calculation 2. Calculation of heterogenous electron-transfer rate constant ($k_0$) using the Nicholson method.

Using equation 2, transfer parameter ($\psi$) was calculated by obtaining the peak to peak separation of each redox couple ($\Delta E_p$), at varying scan rates (0.2-8 V/s) (FIG.?):

$$\psi = \frac{(-0.6288 + 00021\Delta E_p)}{1 - 0.017\Delta E_p} \quad \text{(Equation 3)}$$

The electron transfer rate constant ($k_0$) was then extracted from the slope of a plot of versus $\upsilon^{-1/2}$ $$\psi = \frac{k_0}{\left(\frac{\pi n F D \upsilon}{RT}\right)^{\frac{1}{2}}} \quad \text{(Equation 4)}$$

where n is the number of electrons transferred, F is the Faraday constant (96485 Cmol$^{-1}$), D is the averaged diffusion coefficient for the oxidation and reduction reaction ($D_O$ and $D_R$) (cm$^2$/s), $\upsilon$ is the scan rate (V/s), R is the ideal gas constant (8.314 J/mol·K) and T is the temperature (K).

Calculation 3.
Determination of 70% state of charge (SOC).
Theoretical capacity of the cell=0.0215 mmol×96,485.33 sA/mol=2.07 sA=0.576 mAh
70% state of charge=0.403 mAh
Galvanostatic charging current for 2 h at 70% SOC: 0.403 mAh/2 h=0.201 mA
Galvanostatic discharging current for 2 h at 70% SOC: 0.403 mAh/2 h=0.201 mA where $j_p$ is the current density in A/cm$^2$, $n_e$ is the number of electrons (here $n_e$=1), $D_0$ is the diffusion coefficient (cm$^2$/s), $C_0$ is the bulk concentration (mol/mL) and $\upsilon$ is the scan rate (V/s). Straight lines Other embodiments of the present disclosure are possible. Although the description above describes specific examples, these should not be construed as limiting the scope of the disclosure, but as merely providing illustrations of some of the examples of this disclosure. Various combinations or sub-combinations of the specific features and aspects of the examples can be made and will fall within the scope of this disclosure. Various features and aspects of the disclosed examples can be combined with or substituted for one another in order to form additional examples.

The foregoing description of various examples of the disclosure have been presented for purposes of illustration and description. It is not intended to be exhaustive or to limit the disclosure to the precise examples. Many modifications and variations are possible in light of the above teaching. The examples, as described above, were chosen and described in order to best explain the principles of the disclosure and its practical application to thereby enable others skilled in the art to best utilize the disclosure.

What is claimed is:

1. A Ferrocene (Fc)-substituted organometallic complex, according to Formula I:

or a salt thereof, wherein M is a Group 13 metal and ligands $L_1$ and $L_2$ are independently selected from bis(imino)pyridine compounds of Formula II:

where $R^1$, $R^2$, and $R^3$ are independently selected from a hydrogen atom; hydrocarbon groups R, as defined below, having one to twenty carbon atoms with optional inclusion of one or more heteroatoms selected from oxygen, nitrogen, silicon, sulfur, and halogen atoms, wherein the hydrocarbon group is attached to the pyridine ring by a carbon atom; halogen atoms; hydroxy groups; nitrile groups; amino groups —$NR^{11}R^{12}$; ether groups —OR; carboxamide groups —$C(O)NR^{11}R^{12}$ or —$NR^{11}C(O)R$; keto groups —C(O)R, carboxylic acid groups —C(O)OH or salt thereof; ester groups —C(O)OR; sulfonate groups; phosphonate groups; silyl groups, and nitrate groups; wherein $R^{11}$ and $R^{12}$ are independently selected from a hydrogen atom and hydrocarbon groups and R is a hydrocarbon group, where $R^4$ and $R^5$ are independently selected from a hydrogen atom; an aromatic hydrocarbon group with optional inclusion of one or more heteroatoms selected from oxygen, nitrogen, sulfur, and halogen atoms, with optional inclusion of one or more substituents, wherein the aromatic hydrocarbon group is attached to the imine group by a carbon atom; and where $Ar^1$ and $Ar^2$ are independently selected from Fc-substituted phenyl groups.

2. The Fc-substituted organometallic complex of claim 1, wherein $Ar^1$ and $Ar^2$ are independently selected from a ferrocene substituted phenyl group according to Formula III:

where $R^6$, $R^7$, $R^8$, $R^9$, and $R^{10}$ are independently a hydrogen atom, hydrocarbon groups R, as described below, having one to twenty carbon atoms with optional inclusion of one or more heteroatoms selected from oxygen, nitrogen, silicon, sulfur, and halogen atoms, wherein the hydrocarbon group is attached to the pyridine ring by a carbon atom; halogen atoms; hydroxy groups; nitrile groups; alkylammonium groups, alkylammonium groups attached to the pyridine ring by a carbon atom (—$C(N)R^{11}R^{12}R^{13}$), amino groups —$NR^{11}R^{12}$, ether groups —OR; carboxamide groups —$C(O)NR^{11}R^{12}$ or —$NR^{11}C(O)R$; keto groups —C(O)R, carboxylic acid groups —C(O)OH or salt thereof; ester groups —C(O)OR; sulfonate groups; phosphonate groups; silyl groups, and nitrate groups; wherein $R^{11}$, $R^{12}$ and $R^{13}$ are independently selected from a hydrogen atom and hydrocarbon groups and R is a hydrocarbon group, as described below, with the proviso that at least one of $R^6$, $R^7$, $R^8$, $R^9$, and $R^{10}$ is a ferrocene moiety.

3. The Fc-substituted organometallic complex of claim 2, wherein $R^8$ is a ferrocene moiety.

4. The Fc-substituted organometallic complex of claim 1, wherein $Ar^1$ and/or $Ar^2$ are 4-ferrocenylphenyl.

5. The Fc-substituted organometallic complex of claim 1 wherein $R^1$, $R^2$ and $R^3$ are a hydrogen atom, $R^4$ and $R^5$ are independently a hydrogen atom or an ethoxyphenyl group, and $Ar^1$ and $Ar^2$ are 4-ferrocenylphenyl.

6. The Fc-substituted organometallic complex of claim 1, wherein M is selected from the group consisting of Al, Ga and In; or M is Al.

7. The Fc-substituted organometallic complex of claim 1, wherein the salt is provided and the complex further comprises a counterion selected from the group consisting of $AlCl_4^-$, $BPh_4^-$, $BF_4^-$, $PF_6^-$, $AsF_6^-$, $SbF_6^-$, $OTeF_5^-$, $OClO_3^-$, $(CF_3SO_2)_2N^-$ and $CF_3SO_3^-$.

8. The Fc-substituted organometallic complex of claim 1, wherein the Fc-substituted organometallic complex or salt thereof, is represented by formula IV:

where M is a Group 13 metal, $R_1$ is a hydrogen or an ethoxyphenyl group, $R_2$ is a ferrocenylphenyl group, optionally comprising a counterion.

9. The Fc-substituted organometallic complex of claim 8, wherein $R_2$ is 4-ferrocenylphenyl, $R_1$ is an ethoxyphenyl group, optionally comprising $[CF_3SO_3^-]_n$ as a counterion, wherein n is an integer from 1 to 8.

10. A Non-Aqueous Redox-Flow Battery (NRFB) comprising:
(a) a negative compartment containing a negative electrode disposed within a non-aqueous liquid electrolyte solution;
(b) a positive compartment containing a positive electrode disposed within the non-aqueous liquid electrolyte solution;
(c) a separator interposed between the positive compartment and the negative compartment; wherein at least one of the negative compartment and the positive compartment comprises an Fc-substituted organometallic complex of claim 1.

11. The NRFB of claim 10, wherein both the negative and positive compartments include the Fc-substituted organometallic complex, or only one of the negative and positive compartments includes the Fc-substituted organometallic complex.

12. The NRFB of claim 10, wherein the Fc-substituted organometallic complex is dissolved in a non-aqueous solvent.

13. The NRFB of claim 12, wherein a concentration of the Fc-substituted organometallic complex in the non-aqueous solvent is 0.5 mM to 200 mM.

14. The NRFB of claim 12, wherein the non-aqueous solvent is selected from the group consisting of acetonitrile, gamma-butyrolactone, a cyclic carbonate, propylene carbonate, ethylene carbonate, butylene carbonate, dimethyl carbonate, diethyl carbonate, N-methyl-2-pyrrolidone, N,N-dimethylformamide, N,N-dimethylacetamide, dimethylsulfoxide, dimethyl sulfone, sulfolane, chlorobenzene, cyclopentanone, tetrahydrofuran, 1,4-dioxane, methanol, ethanol, ethylene glycol, diethylene glycol, triethylene glycol, tetraethylene glycol, dimethyl ether, methoxyethane, methoxyethanol, dimethoxyethane, diethylene glycol monomethyl ether, diethylene glycol dimethyl ether, triethylene glycol monomethyl ether, triethylene glycol dimethyl ether, tetraethylene glycol monomethyl ether, tetraethylene dimethyl ether, 1,3-dioxolane, 1,2 propylene glycol, 1,3 propylene glycol and mixtures thereof.

15. The NRFB of claim 10, wherein the separator includes alumina, silica, glass, titania, zirconia, or a anion exchange membrane, optionally the separator is a glass frit.

16. The NRFB of claim 10, wherein the liquid electrolyte solution includes a supporting electrolyte.

17. The NRFB of claim 10 configured to establish electrical communication between the positive electrode, the negative electrode, and an external load directing electrical energy into or out of the NRFB, and/or to establish flow of the electrolyte solutions past the positive and negative electrodes, respectively.

18. The NRFB of claim 10, comprising a storage tank containing additional electrolyte solution in fluidic communication with each of the positive and negative compartments.

19. The NRFB of claim 12, wherein the concentration of the Fc-substituted organometallic complex in the non-aqueous solvent is 1 mM to 100 mM.

20. The NRFB of claim 12, wherein the concentration of the Fc-substituted organometallic complex in the non-aqueous solvent is 5 mM to 20 mM.

* * * * *